United States Patent Office 3,380,993
Patented Apr. 30, 1968

3,380,993
METHODS OF PRODUCING ERYTHROMYCIN ESTERS
Edward Zukowski, ul. Carazziego 4, m. 54; Zygmunt Eckstein, ul. Grochowska 252, m. 1; and Wieslaw Drzewinski, ul. Karola Darwina 9a, m. 68, all of Warsaw, Poland
No Drawing. Filed Aug. 31, 1965, Ser. No. 484,083
Claims priority, application Poland, Sept. 2, 1964, P 105,628
13 Claims. (Cl. 260—210)

This invention relates to improved methods of producing erythromycin esters consisting in reacting erythromycin with suitable ketenes.

The professional literature of recent years largely describes the pharmacological uses of erythromycin esters as antibiotics. These preparations are generally readily soluble in water and diluted acids, and consequently they are more stable in the presence of gastric juices. This is a valuable advantage allowing their use in the form of oral drugs without making it necessary to prepare a special intestinal form.

As known, erythromycin alone cannot be used in an acid medium because it decomposes at a pH-value of less than 5.0.

Apart from this, erythromycin esters exhibit still other known pharmacological advantages.

The literature describes two principal methods of producing erythromycin esters.

These methods are:
(1) A reaction between suitable anhydrides of carboxylic acids and erythromycin in the presence of acidic sodium carbonate or potassium carbonate in a medium of anhydrous acetone.
(2) A reaction between erythromycin and halogen anhydrides of suitable carboxylic acids in the presence of acidic sodium carbonate or potassium carbonate in a medium of anhydrous acetone.

The present invention is a novel method of esterifying erythromycin consisting of reacting erythromycin with suitable ketenes in a medium of anhydrous acetone.

The said ketenes correspond to the general formula:

$$R-(CH_2)_n-CR_1=C=O$$

wherein:
R is hydrogen, alkyl, or a phenoxy group;
$R_1$ is hydrogen or an alkyl group; and
$n$ is a whole number from 0 to 5.

The ketenes can be used after having been separately prepared and introduced into the reaction medium or they can be produced in the reaction mixture and subjected to reaction with erythromycin. This reaction occurs very easily in the medium of a suitable organic solvent, preferably acetone, within a temperature range of from $-20°$ to $+25°$ C.

The described method according to the invention renders it possible to obtain a preparation of high purity and biological activity with a yield exceeding 90%.

The following table shows the results which have been obtained with the use of the method according to the invention (designated as method A) and those of the known methods (designated as method B):

| Serial No. | Method | Yield, percent | Melting point | Remarks |
|---|---|---|---|---|
| 1 | A | 91.2 | 124–126 | Average yield 91.7%. |
| 2 | A | 91.8 | 124–125 | |
| 3 | A | 92.3 | 124–125 | |
| 4 | B | 86.3 | 125–127 | Average yield 85.6%. |
| 5 | B | 87.4 | 123–125 | |
| 6 | B | 83.0 | 125–127 | |

It follows from the above that the method according to the invention provides considerably better results as regards the percentage of yield which on an average is more than 6% greater than that of the known methods.

The method according to the present invention will be more fully explained with reference to the following examples:

Example I

A solution of 8.4 g. of methyl ketene (0.15 mol) in 100 ml. of anhydrous acetone is cooled to a temperature of $-18°$ C. There is added to the solution, while continuously and intensively stirring, 110.1 g. of basic erythromycin disssolved in 1.2 liters of cold anhydrous acetone and the resulting solution is stirred for 2 hours. Thereupon the solution is concentrated to ⅔ of its initial volume and diluted with an equal volume of water. After cooling to a temperature of $-5°$ C. a crystallized ester sediment was filtered, washed several times with a small quantity of cold water and dried at a temperature of between 50 and 60° under decreased pressure. The ester, the propionate of erythromycin, was produced in a yield of 91.2%.

The obtained product exhibited a melting point between 122 and 128° C. which is conformable to known data. Microbiologic activity was 780 µ/mg., and the water content was 6.0%.

It has been established in further examples with other ketenes, that comparable results with those of Example I are obtained with ketenes satisfying the formula as previously defined hereinbefore.

Example II

To a solution of 17 g. (0.1 mol) of the acid chloride of phenoxyacetic acid dissolved in 80 ml. of anhydrous acetone cooled to $-18°$ C., there is added 10.4 g. (0.1 mol) of freshly distilled triethylamine at a rate such that the temperature does not exceed $-10°$ C. The solution is stirred for 10 minutes, whereupon a separated sediment of triethylamine hydrochloride is filtered off. Into the filtrate containing phenoxyketene formed by the reaction between the acid chloride and the triethylamine there is poured a solution, which is cooled to $-5°$ C., of 73 g. of basic erythromycin in 750 ml. of anhydrous acetone, and the resulting solution was stirred for 2 hours. Thereupon the solution was concentrated to ⅔ of the initial volume, diluted with 1 vol. of water and the phenoxyacetate ester of erythromycin was crystallized at a temperature of 0° C. The yield was 93.7%.

The obtained product exhibited a melting point of between 170 and 175° C., a microbiological activity 860 µ/mg., and had a water content of 1.4%.

What is claimed is:
1. A method of producing erythromycin esters which comprises reacting erythromycin with a ketene of the formula:

$$R-[CH_2]_n-CR_1=C=O$$

wherein R is hydrogen, alkyl or phenoxy, $R_1$ is hydrogen or an alkyl group and $n$ is 0–5, in an anhydrous solvent which is inert to ketenes to produce erythromycin esters of the formula:

$$R-[CH_2]_n-CR_1-\overset{O}{\underset{}{C}}-OE$$

wherein R, $R_1$ and $n$ are as defined above and E is erythromycin base.

2. The method as claimed in claim 1 wherein the reaction of erythromycin with the ketene is effected by mixing anhydrous solutions thereof at a temperature of less than 0° C.

3. The method as claimed in claim 2 comprising continuously and intensively stirring the mixed solutions.

4. The method as claimed in claim 1 wherein the reaction of erythromycin with the ketene is effected at a temperature of −20° C. to +25° C.

5. The method as claimed in claim 1 wherein the ketene is produced in situ in an anhydrous solution of erythromycin whereupon the produced ketene is reacted with the erythromycin at a temperature of less than 0° C.

6. The method as claimed in claim 1 wherein the solvent is anhydrous acetone.

7. The method as claimed in claim 2 wherein said anhydrous solutions are each anhydrous acetone solutions.

8. The method as claimed in claim 1 wherein R is methyl, $R_1$ is hydrogen and $n$ is 0.

9. The method as claimed in claim 8 wherein the solvent is anhydrous acetone.

10. The method as claimed in claim 1 wherein R is phenoxy, $R_1$ is hydrogen and $n$ is 0.

11. The method as claimed in claim 10 wherein the solvent is anhydrous acetone.

12. A method of producing the propionic ester of erythromycin which comprises reacting erythromycin with methyl ketene in an anhydrous solvent which is inert to methyl ketene at a temperature less than 0° C.

13. A method of producing the phenoxyacetic ester of erythromycin which comprises reacting erythromycin with phenoxyketene in an anhydrous solvent which is inert to phenoxyketene at a temperature less than 0° C.

References Cited

UNITED STATES PATENTS 3,013,942   12/1961   Celmer _____ 260—210
3,097,135   7/1963    Lynch _____ 260—210

LEWIS GOTTS, *Primary Examiner.*

J. R. BROWN, *Assistant Examiner.*

UNITED STATES PATENT OFFICE
CERTIFICATE OF CORRECTION

Patent No. 3,380,993                        April 30, 1968

Edward Zukowski et al.

It is certified that error appears in the above identified patent and that said Letters Patent are hereby corrected as shown below:

Column 1, line 17, after "generally" insert -- not --.

Signed and sealed this 22nd day of July 1969.

(SEAL)
Attest:

Edward M. Fletcher, Jr.                      WILLIAM E. SCHUYLER, JR.
Attesting Officer                             Commissioner of Patents